A. C. LINDGREN.
CORN PLANTING MECHANISM.
APPLICATION FILED FEB. 13, 1911.
1,000,683.
Patented Aug. 15, 1911.
2 SHEETS—SHEET 1.
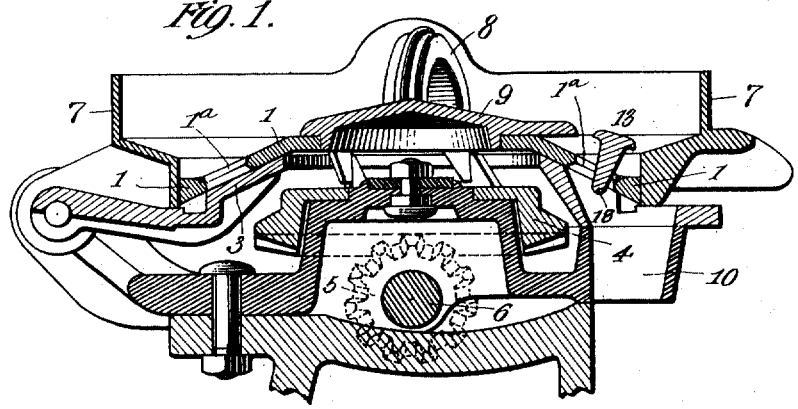
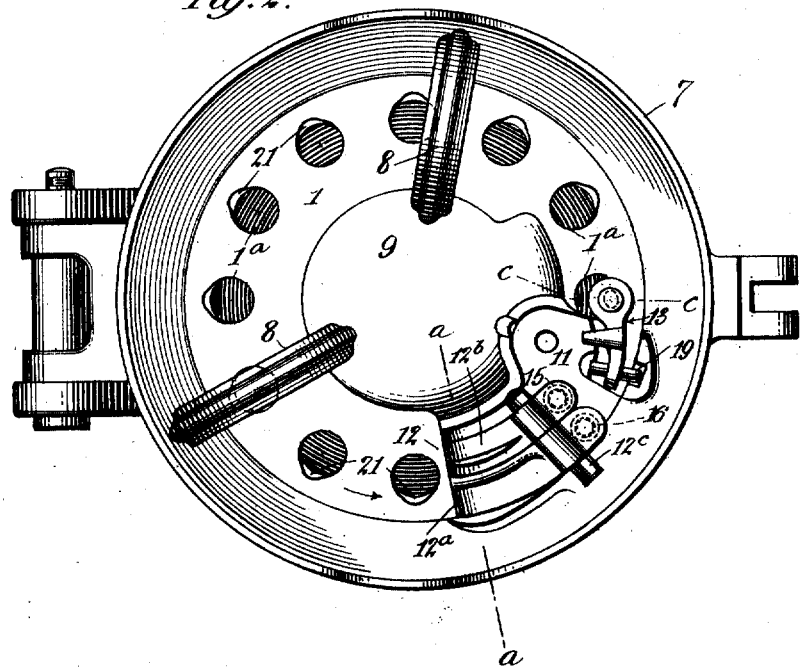

A. C. LINDGREN.
CORN PLANTING MECHANISM.
APPLICATION FILED FEB. 13, 1911.
1,000,683.
Patented Aug. 15, 1911.
2 SHEETS—SHEET 2.
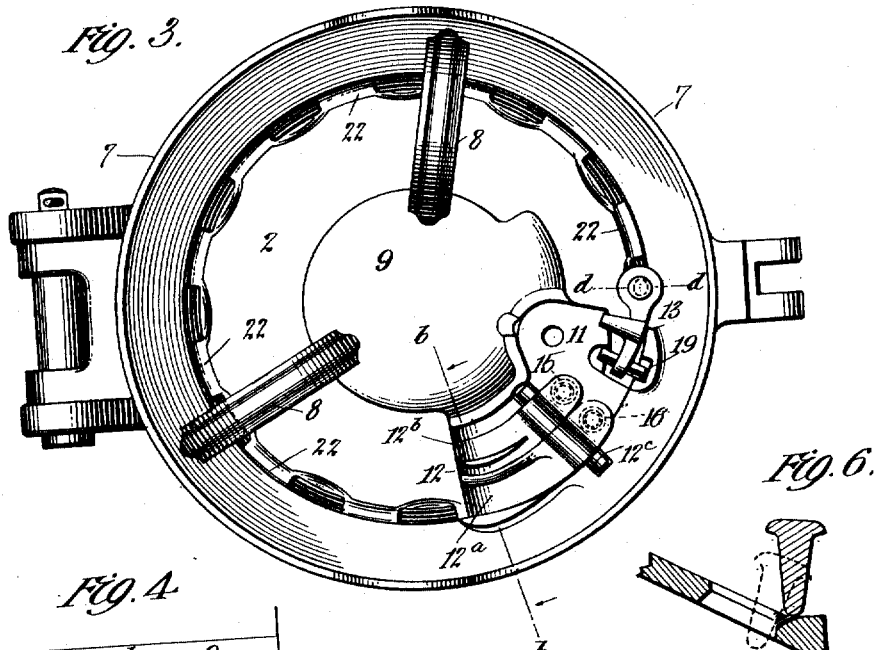
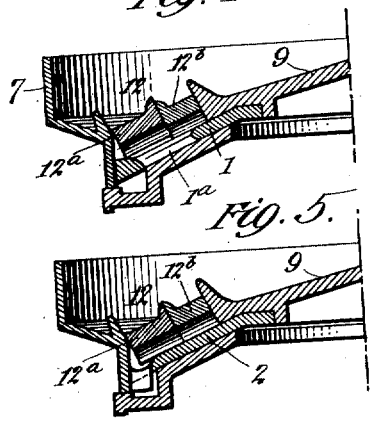
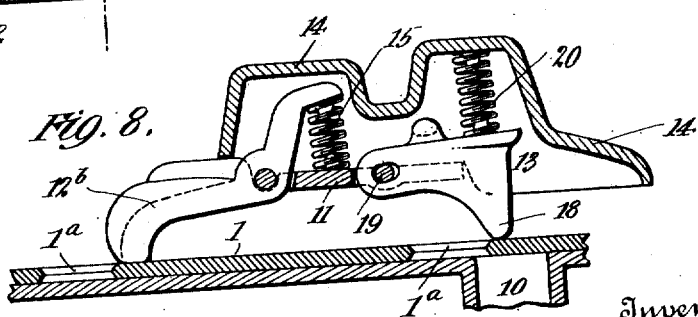

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

CORN-PLANTING MECHANISM.

1,000,683.     Specification of Letters Patent.     Patented Aug. 15, 1911.

Original application filed June 3, 1910, Serial No. 564,763. Divided and this application filed February 13, 1911. Serial No. 608,180.

*To all whom it may concern:*

Be it known that I, ALEXUS C. LINDGREN, of Moline, county of Rock Island, and State of Illinois, have invented a new and useful Improvement in Corn-Planting Mechanism, of which the following is a specification, being a division of my original application filed June 3, 1910, Serial No. 564,763.

This invention relates to seed discharging mechanism, and has reference more particularly to that type of mechanism used for planting corn, and comprising a can or hopper having in its bottom a rotary distributing plate containing seed cells to receive the kernels from the overlying mass of seed in the hopper, and operating by its rotation to carry the kernels in succession over a discharge opening in the bottom of the hopper through which they are discharged.

It is the common practice to employ dropper plates of different forms for different kinds of planting, one form of plate having closed circular seed cells in which the kernels are carried on their side to the point of delivery, and another form of plate having open notches in its periphery constituting edge cells in which the kernels are carried on edge to the point of delivery, these plates being interchangeable so that one or the other may be employed in the discharging mechanism as desired. In connection with rotary seed plates of these types, cut-off mechanisms and knocker devices are employed, which devices overlie the plates so as to operate in conjunction with the cells therein, the function of the cut-off mechanism being to insure the separation of the individual kernels from the overlying mass of seed in the hopper, and their proper entry into the cells; and the function of the knocker device being to insure the certain discharge of the kernels from the cells in the plate. By reason of the fact that the open edge cells are farther from the center of the plate than the closed circular flat cells, it is customary when the plates are changed, to also change the cut-off mechanism and knocker device so that these latter devices will occupy their proper relations to the cells of the different plates. This necessity for a change of the cut-off mechanism and knocker device, is objectionable for many reasons, mainly because it entails a waste of time in making the change, and requires that special parts be kept on hand, and further there is danger of loss or displacement of such parts.

The present invention is designed to overcome this objection, and the invention consists in an improved form of cut-off mechanism adapted to operate either in connection with a plate having circular closed seed cells, or in connection with a plate having open edge cells, so that no change or substitution of parts will be required in the cut-off mechanism when the different forms of plates are employed.

The invention consists also of an improved form of knocker device mounted movably so that when in one position it will act in connection with the round cells in one form of plate, and when in another position will operate in connection with edge cells in a different form of plate.

In the accompanying drawings: Figure 1 is a vertical sectional elevation taken centrally through Fig. 2 showing the seed discharging mechanism and its driving parts with my invention embodied therein. Fig. 2 is a top plan view of the same showing the mechanism equipped with a dropper plate having round or flat cells, the covering casing for the cut-off mechanism and knocker device being removed. Fig. 3 is a similar view showing the mechanism equipped with a dropper plate having edge cells. Fig. 4 is a transverse section on the line *a—a* of Fig. 2. Fig. 5 is a similar view on the line *b—b* of Fig. 3. Fig. 6 is a transverse section taken on the line *c—c* of Fig. 2. Fig. 7 is a sectional view on the line *d—d* of Fig. 3 through the knocker device. Fig. 8 is a section taken on a line extending circumferentially through the knocker device and cut-off mechanism and their covering cap or casing.

Referring to the drawings: the seed discharging mechanism is mounted and sustained in any suitable manner in the bottom of a can or hopper not shown, and includes a rotary seed distributing plate, which may be either of the form indicated by the numeral 1 in Fig. 2 with circular closed seed cells 1ᵃ arranged at intervals near its periphery in which the kernels are carried on their side, or it may be of the form indicated by the numeral 2 in Fig. 3 with open edge cells in its periphery in which the kernels are carried on edge. The dropper plates are removable from the mechanism and interchangeable so that one or the other may be used as desired, and they are mounted and rotated in any suitable manner. In the present instance the plate is seated loosely on a ring-like guiding plate 3 sustained by the frame of the machine, and is movably interlocked with an underlying driving wheel 4 mounted to rotate in the frame and provided on its under side with bevel gear teeth engaged by a bevel gear 5 on a driving shaft 6. Surrounding the dropper plate and extending upwardly from its edge, is a fixed circular casting or ring 7 to which the lower edge of the hopper is adapted to be fixed; and carried by the ring by means of radial arms 8, is a central cover plate 9 which overlies the center of the seed plate, leaving its outer edge in which the cells are formed, exposed so that the mass of seed in the hopper will rest on the exposed portion of the dropper plate and be caused to enter the cells therein as the plate is rotated, the result being that the kernels will be carried by the plate and discharged in succession through a discharge opening 10 in the bottom of the hopper.

On one side and adjacent the discharge opening, the cover plate has projecting from it a bracket arm 11 which is connected at its outer end with the inner side of the ring 7. This bracket arm gives support at one end to a cut-off mechanism 12, and at its opposite end to a knocker device 13, so that the seed cells traveling in the direction indicated by the arrow in Fig. 2 will first be presented to the action of the cut-off mechanism, and then to the action of the knocker device, a casing or cap 14 being applied to the bracket arm so as to cover and house the said cut-off mechanism and knocker device and thereby prevent the seed in the hopper from coming in contact with these devices except when presented thereto in the proper manner and as above described.

The cut-off mechanism comprises two spring actuated fingers, an outer one 12ª and an inner one 12ᵇ mounted side by side to rock independently on a horizontal transverse axis formed by a horizontal pin 12ᶜ extending loosely through alining openings in the two fingers and seated at its end in bearing sockets in the inner and outer edges respectively of the bracket arm 11. The fingers are formed at one side of their pivotal axis, so that they will rest at their ends on the upper surface of the seed plate, these active ends of the fingers being held yieldingly down on the surface of the plate by two springs 15 and 16 bearing at their upper ends on the ends of the fingers opposite their active ends, and bearing at their lower ends upon and supported by the bracket arm 11. These fingers are of such width that they will conjointly bridge the space between the outer edge of the central cover plate and the outer edge of the dropper plate, and when a dropper plate of the form shown in Fig. 2 is employed, the seed cells therein will pass beneath the ends of the two fingers and the latter will both coöperate in the cut-off action in effecting the separation of the individual kernels from the mass and insuring their proper entry singly into the cells. By reason of the fact that these fingers may yield independently, a kernel entering the cell at one side and in such position as to cause one of the fingers to yield or rise, will not affect the other one, so that there will be no liability in these circumstances of a second kernel entering and wedging in the cell with the first, as there would be if the two fingers were lifted together by a kernel at one side.

When a dropper with edge cells of the form represented in Fig. 3 is employed the outer finger 12ª only becomes active and it overlies the cells in the outer edge of the plate, the lifting action of this finger having no effect on the inner finger, which latter at all times remains down and effectually prevents the entrance of kernels between the dropper plate and cut-off except when they are carried in the cells.

The knocker device consists of a finger having a depending nose 18 adapted to enter the cells as the plates are rotated, and spring pressed so as to dislodge any kernels that will not readily leave the cells. The finger is pivotally mounted, being provided at its end opposite its nose with a hole to receive a pivot pin 19 which is seated in sockets in the bracket arm, a spring 20 being seated between the upper side of the finger and under side of the cap plate and acting to hold the finger down yieldingly. The hole in the finger is elongated slightly so that the finger may move bodily laterally on the pivot pin, and also tip thereon horizontally from an inner position as shown in Fig. 2 to an outer position as shown in Fig. 3, to the end that it may coöperate with the round cells in a plate of the form shown in Fig. 2 or with edge cells in a plate of the form shown in Fig. 3.

When a plate with round cells, as shown in Fig. 2, is employed, the finger will occupy its inner position, and its nose will as the plate is rotated, enter the cells in succession and engaging the kernels therein will dislodge them and insure that they will leave the cells and pass out through the discharge opening in the hopper. If there is a tendency of the nose of the finger to shift outwardly beyond the outer wall of the cells as shown more clearly in Fig. 6, this action is counteracted by means of guiding surfaces 21, formed by cutting away the outer wall of the cells slightly, such cut-away portion acting when the nose encounters the same, to direct the finger laterally into the cell.

When a dropper plate of the form shown in Fig. 3 is employed, which dropper plate is provided in its periphery with open edge cells, these cells being at a greater distance from the center than the round cells, an outward shifting of the knocker device is required in order that it may coöperate with the edge cells. This outward shifting of the finger will be effected automatically by reason of the capability of the finger to shift laterally and tip on its pivot pin, which action is facilitated by the form of the upper surface of the plates, which surface is curved upwardly from its outer periphery or is dome like. As a result, the nose of the finger, when a plate with edge cells is employed, will slide down the dome like surface of the plate, in taking its position, and will finally come to rest with its ends in line with the edge cells. When, now, the plate is rotated, the nose of the knocker device will enter the cells in succession, its outer proper position relative to the cells being maintained by means of circumferential guiding grooves 22 formed in the spaces between the cells. It is seen, therefore, that by reason of the capability of the knocker finger to shift laterally and rock on its pivot pin, it may operate either in an inward position in conjunction with round cells, or it may operate in an outward position in conjunction with edge cells, the adjustment of the finger for the different positions being automatically controlled by the form of the cells in the respective plates.

In the accompanying drawings, I have shown my invention in the form which I prefer to adopt and which in practice has been found to answer to a satisfactory degree the ends to be attained, but it will be understood that the details may be variously modified without departing from the spirit of my invention, provided the operation is substantially as indicated above, and it will be further understood that the invention is not to be limited to any particular form or construction of the parts, except in so far as such limitations are specified in the claims.

Having thus described my invention, what I claim is:

1. A knocker device for seed dropping plates having seed cells, said device consisting of a knocker finger movable into the cells and movable also laterally with reference to the cells; whereby the said knocker is adapted to operate in connection with a plate having edge cells or with a plate having cells inside its edges.

2. A knocker device for seed discharging plates having seed cells, said device consisting of a pivotal knocker finger adapted to rock on its pivot and dislodge the seed from the cells and movable transversely of its pivotal movement.

3. In a seed distributing mechanism, the combination of a rotary dropping plate provided with seed cells and with a circumferential guiding surface, a knocker device mounted above the plate and movable laterally with reference thereto, said knocker device being engaged by the guiding surface.

4. In a seed discharging mechanism and in combination with removable, interchangeable seed dropping plates provided with seed cells, said cells differing in the two plates in respect to their distance from the center, a knocker device adapted to enter the cells to dislodge the seed and movable laterally to and from the center of the plate; whereby the said knocker is adapted to operate at an inner position in connection with the cells of one plate, and is adapted also to operate at an outer position in connection with the cells of another plate.

In testimony whereof I hereunto set my hand this fifth day of January, 1911, in the presence of two attesting witnesses.

ALEXUS C. LINDGREN.

Witnesses:
  L. C. BLANDING,
  A. C. BARBER.

---

Copies of this patent may be obtained for five cents each, by addressing the "Commissioner of Patents, Washington, D. C."